United States Patent

Moote et al.

[11] Patent Number: 5,449,258
[45] Date of Patent: Sep. 12, 1995

[54] RETAINER CLIP AND SHAFT FASTENER APPARATUS AND METHOD

[75] Inventors: Donald B. Moote, Lake Orion, Mich.; Teodor G. Nedelcu, Willowdale, Canada

[73] Assignee: ITT Corporation, New York, N.Y.

[21] Appl. No.: 143,479

[22] Filed: Oct. 26, 1993

[51] Int. Cl.⁶ .................................. F16B 21/18
[52] U.S. Cl. .................................. 411/521; 411/517; 411/918
[58] Field of Search .................. 411/520, 521, 525, 526, 411/516, 517, 918

[56] References Cited

U.S. PATENT DOCUMENTS

| | | |
|---|---|---|
| 32,360 | 3/1900 | Pierce . |
| 913,024 | 2/1909 | Meacham .................. 411/521 |
| 1,460,749 | 7/1923 | Dull . |
| 1,675,277 | 6/1928 | Roe . |
| 1,752,982 | 4/1930 | Herold . |
| 1,890,348 | 12/1932 | Weatherhead, Jr. . |
| 2,004,182 | 6/1935 | Arey . |
| 2,169,181 | 8/1939 | Kost . |
| 2,521,567 | 9/1950 | Corrigan .................. 411/521 |
| 2,568,584 | 9/1951 | Hartman .................. 411/525 |
| 2,687,228 | 8/1954 | Knocke . |
| 2,712,262 | 7/1955 | Knohl . |
| 2,799,202 | 7/1957 | Patten .................. 411/525 |
| 2,831,368 | 4/1958 | Collins et al. . |
| 2,880,641 | 4/1959 | Sislik .................. 411/521 |
| 3,036,793 | 5/1962 | Becker .................. 411/918 |
| 3,108,371 | 10/1963 | Munse . |
| 3,320,846 | 5/1967 | Orain . |
| 3,448,494 | 6/1969 | Boyenval .................. 411/521 |
| 3,481,381 | 12/1969 | Black . |
| 3,679,276 | 7/1972 | Stenlund . |
| 4,157,725 | 6/1979 | Stanaitis . |
| 4,385,431 | 5/1983 | Holton . |
| 4,620,356 | 11/1986 | Maus et al. . |
| 4,776,740 | 10/1988 | Holton . |
| 4,834,603 | 5/1989 | Holton . |
| 5,007,781 | 4/1991 | Jensen et al. . |
| 5,182,957 | 2/1993 | Bohmer et al. . |

FOREIGN PATENT DOCUMENTS

| | | |
|---|---|---|
| 0511832 | 11/1992 | European Pat. Off. . |
| 8232482 | 7/1983 | Germany . |
| 4028892 | 3/1992 | Germany . |
| 1071565 | 6/1967 | United Kingdom . |

*Primary Examiner*—Flemming Saether
*Attorney, Agent, or Firm*—Robert P. Seitter; J. Gordon Lewis

[57] ABSTRACT

A combined retainer clip and shaft for axially fastening a mechanical element to the shaft includes a shaft being hardened to a predetermined hardness. The retainer clip is formed of an annular body with a frusto-conical annulus surrounding a generally central aperture and hardened to a hardness higher than the hardness of the shaft. The retainer clip is mounted on the shaft at a predetermined position to fixedly mount the mechanical element on the shaft. In one embodiment, a plurality of notches are circumferentially spaced about the portion of the annulus surrounding the aperture in the body to form a discontinuous shaft engaging surface.

12 Claims, 2 Drawing Sheets

RETAINER CLIP AND SHAFT FASTENER APPARATUS AND METHOD

BACKGROUND OF THE INVENTION

1. Field of the Invention

The present invention relates, in general, to one-piece apertured fasteners which are fixedly mountable on a shaft, stud, pin or the like to attach a mechanical element to the shaft.

2. Description of the Art

A variety of one-piece apertured fasteners which are fixedly mountable over a cylindrical shaft, stud or pin to attach a mechanical element, such as a metal sheet or panel, to the shaft are well known. In one type of fastener, an aperture is pierced or punched in a metal sheet and notches are formed in the portion of the sheet surrounding the aperture to form projections which engage a shaft or stud forced through the aperture to mount the fastener on the shaft or stud.

In another common fastener of this type, a frusto-conical annulus is formed in a generally annular blank and simultaneously an aperture is formed centrally in the annulus. The edge of the annulus surrounding the aperture forms a shaft engaging edge.

Such fasteners are used in a variety of applications to join a mechanical element, such as a panel, sheet, etc., to a shaft, stud or pin. In certain applications, the shaft is nickel plated for long life, high strength, etc. However, the use of nickel plating creates problems relating to the increased cost of providing environmentally safe plating operations, difficulties in forming a constant uniform thickness of the nickel plate on the shaft, and the occurrence of scratches through the nickel plating on the shaft when the fastener is forced over a shaft or stud, and the high cost of the plating operation itself. As a result, it is clear that other fastening techniques without these deficiencies are needed. Thus, it would be desirable to provide a fastener which retains a mechanical element to a shaft which eliminates the need for plating of the shaft to provide anti-corrosion properties.

SUMMARY OF THE INVENTION

The present invention is a retainer clip and shaft fastener apparatus and method. The retainer clip and shaft form a combined fastener apparatus for axially mounting an apertured mechanical element, such as a sheet or panel, to the shaft. The fastener apparatus comprises the shaft having a generally circular cross section portion and an axial length insertable through an aperture formed in a mechanical element. The shaft is formed with a predetermined hardness. The retainer clip includes a one-piece metallic body having a generally frusto-conical annulus with an aperture formed coaxially therein. An annular edge of the frusto-conical annulus surrounding the aperture forms a shaft engaging surface. The retainer clip is formed to a hardness greater than the hardness of the shaft.

The shaft is preferably tenifered or heat treated to a predetermined hardness. The shaft may be case hardened or hardened completely through its cross section. The body of the retainer clip is likewise heat treated to a hardness greater than that of the shaft on which it is to be mounted. Optionally, the body may be provided with an outer, anti-corrosion coating.

In a preferred embodiment, the annular shaft engaging edge is continuous and formed at a constant diameter. In another embodiment, the body of the retainer clip includes a plurality of spaced notches formed in the annular shaft engaging edge and extending radially outward from the aperture to form discontinuities in the shaft engaging surface of the body.

Further, the present invention discloses a unique method for securing an apertured element to a generally cylindrical, circular cross sectioned shaft. The method comprises the steps of:

a) forming a shaft with a generally circular cross section portion, b) hardening the shaft to a predetermined hardness, c) forming an annular body having a generally frusto-conical annulus and an aperture formed coaxially therein, an annular edge of the frusto-conical annulus surrounding the aperture forming a shaft engaging edge, d) hardening the body to a hardness greater than the hardness of the shaft, e) mounting the annular body over the shaft to a predetermined position along the length of the shaft, and f) mounting an aperture in a mechanical element over the shaft, with the mechanical element engaged with the body of the retainer clip to fixedly axially position the mechanical element with respect to the shaft.

According to this method, the step of hardening the shaft comprises the step of tenifering the shaft to form a hardened surface layer on the shaft. The body of the retainer clip may be hardened by any means, including heat treatment, tenifering, nitrocarborizing, etc. Further, an anti-corrosive coating may be applied to the body of the retainer clip.

In another embodiment, the present method includes the step of forming notches in the shaft engaging edge of the annular body extending radially outward from the aperture in the frusto-conical annulus.

The retainer clip and shaft fastener apparatus and method of the present invention provides a unique retainer clip which addresses certain deficiencies found in the use of previously devised apertured retainer clips. By providing an apertured retainer clip having a hardness greater than the hardness of a suitably hardened shaft on which the retainer clip is mounted, nickel plating operations previously employed to provide corrosion resistant coatings on the shaft are eliminated. Further, the hardened retainer clip is employed in the same manner as previously devised apertured retainer clips and, in conjunction with a hardened shaft, provides a pull out force equal to or greater than previously devised apertured fasteners used on nickel plated shafts.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
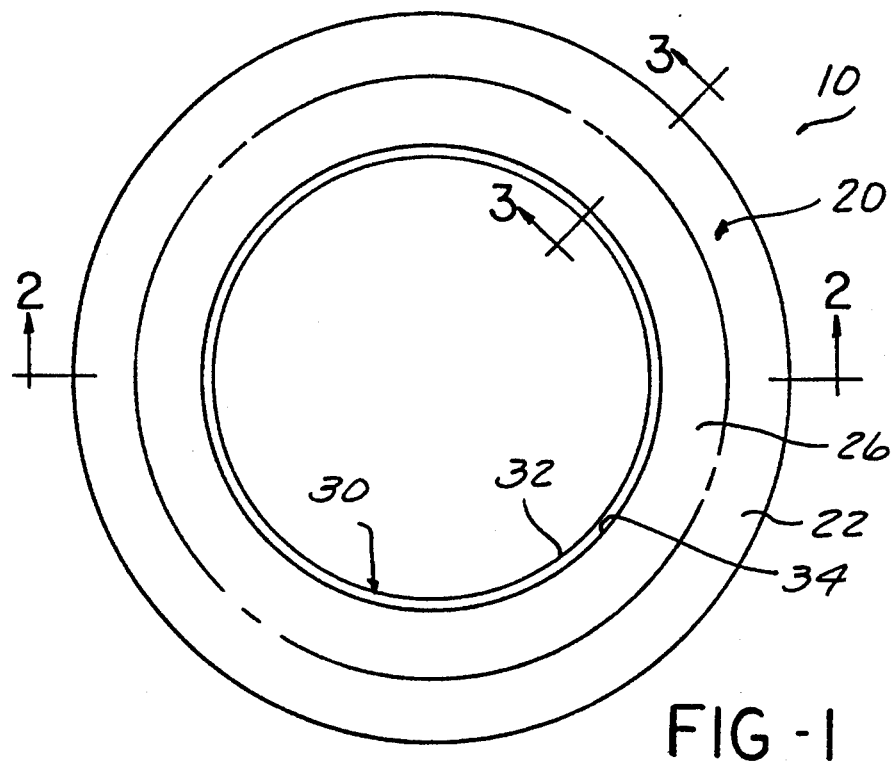
FIG. 1 is a plan view of a retainer clip constructed in accordance with the teachings of one embodiment of the present invention.
Figure 2:
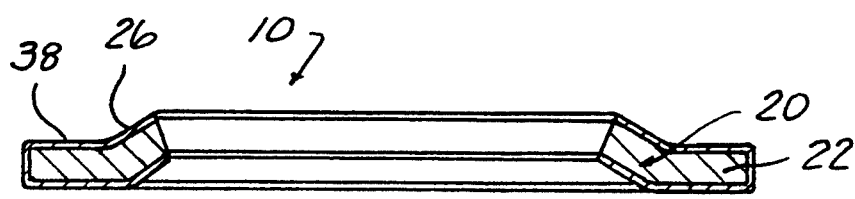
FIG. 2 is a cross sectional view generally taken along line 2—2 in FIG. 1.
Figure 3:
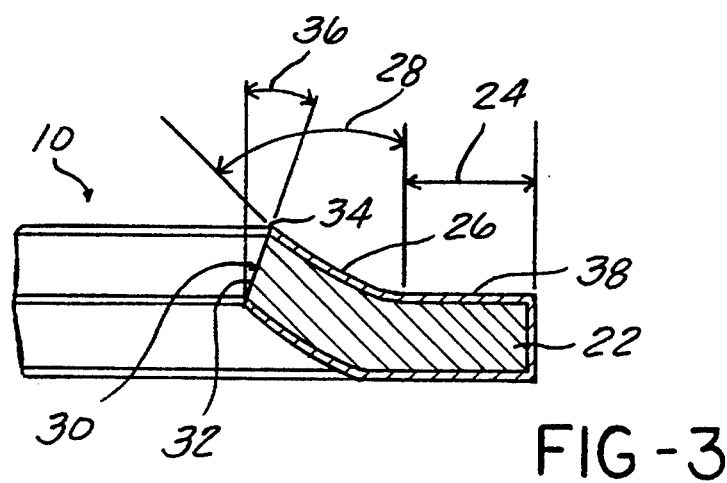
FIG. 3 is a partial, further enlarged view of an edge portion of the retainer clip shown in FIG. 2.

Referring now to the drawing, and to FIGS. 1–3 in particular, there is depicted a retainer clip 10 usable to axially fix a mechanical element, such as a sheet, panel, etc., to a cylindrical, generally circular cross sectioned shaft.

Figure 4:
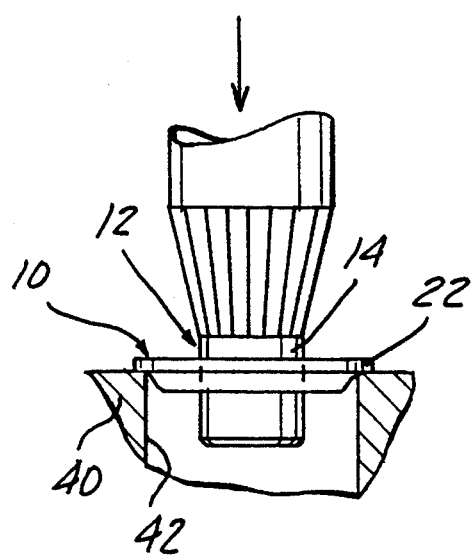
FIG. 4 is a partially cross sectioned view showing the mounting of the retainer clip shown in FIG. 1 on a shaft.
Figure 5:
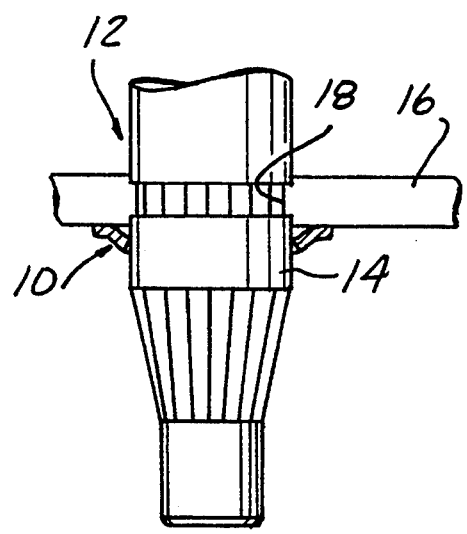
FIG. 5 is an elevational view showing the use of the retainer clip of the present invention to secure a mechanical element to the shaft.

An example of a shaft 12 usable with the retainer clip 10 is shown in FIGS. 4 and 5. The shaft 12 has a generally cylindrical, circular cross section portion 14 and is formed of a suitable high strength material, such as stainless steel, AISI 410, for example. Further, the shaft 12 may comprise any shaft, stud or pin having the described generally cylindrical, circular cross section portion. The illustrative shaft 12 shown in FIGS. 4 and 5 is a mounting shaft for a windshield wiper pivot link and is depicted by way of example only.

According to the present apparatus and method, the shaft 12, or at least the circular cross section portion 14 of the shaft 12, is hardened to a predetermined hardness by suitable means. For example, a conventional heat treatment process may be applied to the shaft 12 to harden the entire cross section of the shaft 12. Preferably, the shaft 12 is case or surface hardened by carbonitriding, such as commonly referred to as a tenifer or nitride process. The shaft 12 may be hardened to any suitable hardness level depending upon the needs of a particular application. For use in the exemplary windshield wiper pivot joint shown in FIG. 5, the shaft 12 is hardened to 32–35$R_c$. However, it will be understood that this hardness level is described by way of example only as the shaft 12 may be hardened to any other hardness depending upon the needs of a particular application.

As shown in FIG. 5, the shaft 12 is designed to receive a mechanical element 16 thereon which is fixed in an axial position along the shaft 12 by means of the retainer clip 10. The mechanical element 16 may be a metallic sheet, panel, etc, having an aperture 18 formed therein which is slightly larger in diameter than the O.D. of the shaft 12. The mechanical element 16 is inserted over the shaft 12 by disposing the aperture 18 in the mechanical element 18 over the shaft 12 and axially moving the mechanical element 16 along the shaft 12 until it is in engagement with the retainer clip 10 as described in detail hereafter.

The retainer clip 10, as shown in FIGS. 1–5, is formed of a one-piece metallic body 20. Any suitable material, such as steel, stainless steel, etc., may be employed to form the body 20 of the retainer clip 10. By way of example only, the body 20 is formed of carbon steel, AISI 1050.

Preferably the body 20 has an annular form or shape obtained by piercing or punching the body 20 from a blank. The body 20 is formed by suitable means, i.e., piercing, punching, die forming, etc., with an outer, generally planar peripheral edge flange 22. The flange 22 has a predetermined radius as denoted by reference number 24 in FIG. 3. By means of a suitable punching operation, a generally dome shaped, frusto-conical annulus 26 is formed in the body 20 and extends outward from the plane of the outer, peripheral edge flange 22. The frusto-conical annulus 26 may be disposed at any predetermined angle, as denoted by reference number 28 in FIG. 3, with respect to the peripheral flange 22 of the body 20 of the retainer clip 10. By way of example only, forming a radius of between 2.0 and 3.0 mm., with 2.5 mm. being preferred, between the annulus 26 and the top surface of the peripheral edge flange 22 will dispose the top surface of the annulus 26 at an angle of substantially 155° from the top surface of the peripheral edge flange 22.

Simultaneous with or after the frusto-conical annulus 26 is formed in the body 20, an aperture denoted by reference number 30 is formed by piercing, punching, etc., coaxially within the body 20 with respect to the outer edge or O.D. of the peripheral edge flange 22. The peripheral portion of the frusto-conical annulus 26 surrounding the aperture 30 which includes two opposed edges, namely a shaft engaging edge or surface 32 of a first diameter and a non-shaft contacting edge or surface 34 of a second diameter larger than the first diameter of the shaft engaging edge 32 due to the angular projection of the annulus 26 out of the plane of the peripheral edge flange 22. As shown in FIG. 3, the shaft engaging surface 32 is disposed at a predetermined angle denoted by reference number 36 from a vertical axis extending through the shaft engaging edge 32 in parallel to a central axis through the body 20 to provide a predetermined amount of locking force to firmly seat and fixedly position the retainer clip 10 on the shaft 12 as well as to provide resiliency or springiness to enable the shaft 12 to be inserted in one direction through the aperture 30 in the body 20 of the retainer clip 10. However, the angle 36 of the peripheral surface of the annulus 26 surrounding the aperture 30 and the angle 28 of the frusto-conical annulus 26 with respect to the peripheral edge flange 22 are selected so as to resist movement of the shaft 12 in an opposite direction from the insertion direction of the shaft 12 through the aperture 30 in the body 20.

According to a preferred embodiment, the body 20 of the retainer clip 10 is hardened by suitable heat treatment process, i.e., carbonitriding, tenifering, etc., process to a hardness level greater or higher than the hardness of the shaft 12. Thus, in the exemplary use of the shaft 12 in a windshield wiper pivot joint, shown in FIG. 5, the retainer clip 10 is hardened to 42–45$R_c$ and stress relieved.

Further, the body 20 may be coated with an anti-corrosion coating 30. Such anti-corrosion coating 38 may be formed of any suitable material, such as zinc dichromate, copper oxide, zinc plate, black cadmium, 15 black chromate, etc. The anti-corrosion coating 38 may be applied to the body 20 of the retainer clip 10 by suitable means, such as coating, electrostatic painting, etc. Further, the body 20 may be coined to provide additional springiness to increase the locking force of the shaft engaging edge 32 on the shaft 12.

In a specific example for use with a shaft 12 having a 12 mm diameter and tenifered to a hardness of 32–35$R_c$, the retainer clip 10, before the optional anti-corrosion coating is applied, has an O.D. of 19.90 mm., an aperture diameter of 11.75 mm. at the shaft engaging edge 32 and a peripheral flange 22 thickness of 1.06 mm. The angle 36 of the shaft engaging surface 30 between the shaft engaging edge 32 and the non-shaft contacting edge 34 and a vertical axis extending through the shaft engaging edge 32 is approximately 19°. With these dimensions and the afore-mentioned hardness relationship between the retainer clip 10 and the shaft 12, it was found that the retainer clip 10 could withstand a pull out force of 3K newtons.

FIG. 4 depicts an assembly method for mounting the retainer clip 10 in a predetermined axial position on the shaft 12. Prior to assembly, it is preferred that the retainer clip 10 and the shaft 12 be degreased so as to provide the maximum possible retaining force of the retainer clip 10 on the shaft 12. Initially, the retainer clip 10, formed as described above, is centered in a die 40 having a circular bore 42 formed therein. Suitable mounting means, not shown, are used to axially center the retainer clip 10 over the bore 42 in the die 40. The shaft 12 is then forced through the aperture 30 in the retainer clip 10 to the desired position, with the shaft engaging edge 32 of the retainer clip 10 engaging the exterior surface of the shaft 12 with sufficient force to firmly and fixedly hold the retainer clip 10 on the shaft 12. As shown in FIG. 5, the mechanical element 16 may then be mounted over the shaft 12 into engagement with the retainer clip 10 to fixedly and axially position the mechanical element 16 at a predetermined position along the length of the shaft 12.

Figure 6:
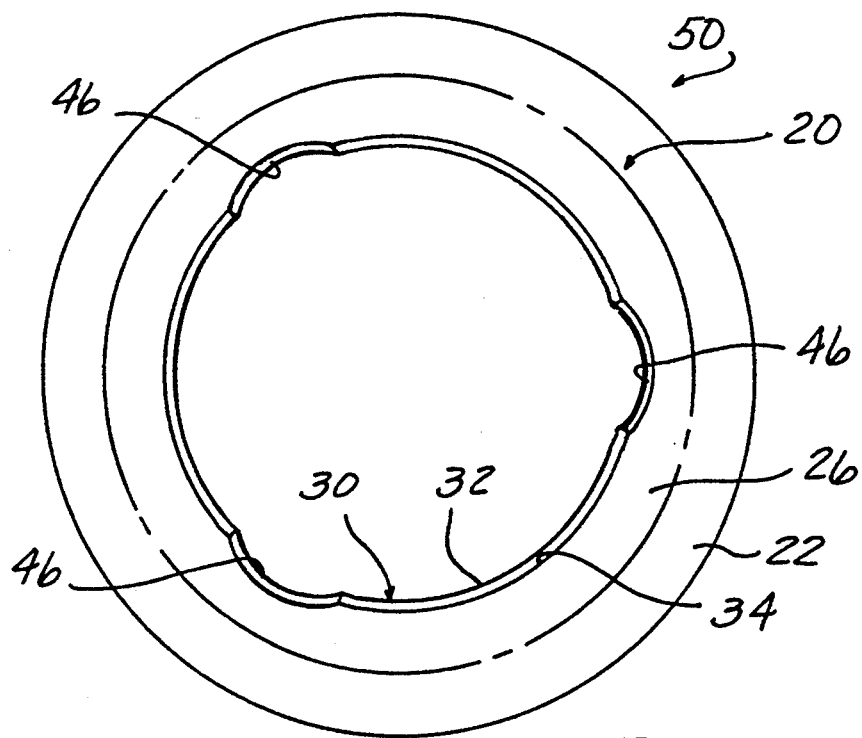
FIG. 6 is an enlarged, plan view of a retainer clip constructed in accordance with the teachings of another embodiment of the present invention.

Another embodiment of the present invention is depicted in FIG. 6. In this embodiment, the retainer clip 50 is still hardened to a higher hardness than the hardness of the shaft 12 on which it is to be mounted. However, in this embodiment, the body 20 of the retainer clip 50 is provided with a plurality of notches which are formed in the shaft engaging edge 32 and preferably extend completely from the non-shaft engaging edge 34 to the shaft engaging edge 32 in the portion of the annulus 26 surrounding the aperture 30. Three equi-circumferentially spaced notches 46 are shown in FIG. 6 by way of example only; it being understood that any other number of notches 46 may be formed in the shaft engaging edge 32. The notches 46 also may have any shape, such as the generally arcuate shape shown in FIG. 6, with an approximate depth of 0.5 mm., as well as straight sided, generally square, rectangular, triangular shapes, etc. The notches 46 extend radially outward from the aperture 30 into the frusto-conical annulus 26 and form discontinuities in the shaft engaging edge 32 of the body 20 to provide a non-continuous shaft engaging edge 32.

In summary, there has been disclosed a unique retainer clip and shaft fastener apparatus and method which provides advantages over previously devised apertured retainer clips for retaining mechanical elements on a cylindrical shaft, stud or pin. The retainer clip fastener apparatus and method of the present invention provides a hardened shaft which eliminates the need for nickel plating operations on the shaft. This results in a lower cost shaft due to the less expensive heat treatment operation employed to obtain the desired hardness level as well as eliminating environmentally costly plating operations. By forming the retainer clip to a hardness greater than the hardness of the shaft, the retainer clip can still be fixedly mounted in engagement with the hardened shaft despite the increased hardness of the shaft.

What is claimed is:

1. A retainer clip and shaft combination for axially securing an apertured mechanical element to the shaft, the combination comprising:

the shaft having a generally circular cross section and a non-exterior plated axial length extendible through the apertured mechanical element;

the shaft hardened to a predetermined hardness;

the retainer clip including a one-piece metallic body having a generally frusto-conical annulus and an aperture formed coaxially within the frusto-conical annulus, an annular edge of the annulus surrounding the aperture forming a shaft engaging surface; and the body of the retainer clip hardened to a hardness greater than the hardness of the shaft.

2. The combination of claim 1 wherein the shaft is a tenifered shaft having a predetermined hardness.

3. The combination of claim 1 wherein the shaft is a case hardened shaft.

4. The combination of claim 1 wherein the body is a heat treated body.

5. The combination of claim 1 wherein the body further includes an outer, anti-corrosive coating.

6. The combination of claim 1 wherein the body further comprises:

a plurality of spaced notches formed in the shaft engaging surface of the body and extending radially outward from the aperture to form a discontinuous shaft engaging surface on the body.

7. The combination of claim 6 wherein the notches are equi-circumferentially spaced about the shaft engaging surface of the body.

8. A method of securing an apertured mechanical element to a generally cylindrical, circular cross sectioned shaft comprising the steps of:

forming the shaft with a generally circular cross section portion;

hardening the shaft to a predetermined hardness without exterior plating;

forming an annular body of a one-piece metallic material having a generally frusto-conical annulus and an aperture formed coaxially within the annulus, an annular edge of the annulus surrounding the aperture forming a shaft engaging surface;

hardening the body to a hardness greater than the hardness of the shaft;

mounting the body over the shaft to a predetermined position along the axial length of the shaft; and mounting the apertured mechanical element over the shaft into engagement with the body of the retainer clip to fixedly and axially position the mechanical element on the shaft.

9. The method of claim 8 wherein the step of hardening the shaft comprises the step of tenifering the shaft to form a hardened surface layer on the shaft.

10. The method of claim 8 further comprising the step of applying an anti-corrosive coating to the body.

11. The method of claim 8 further comprising the step of:

forming a plurality of notches in the shaft engaging surface of the frusto-conical annulus, the notches extending radially outward from the aperture in the frusto-conical annulus to form a discontinuous shaft engaging surface about the aperture.

12. The method of claim 11 further comprising the step of:

equi-circumferentially spacing the notches about the shaft engaging surface in the frusto-conical annulus.

* * * * *